United States Patent
Eide et al.

(10) Patent No.: US 10,108,575 B2
(45) Date of Patent: Oct. 23, 2018

(54) CONCURRENT MAINTENANCE OF MODULAR PCIE I/O EXPANSION DRAWER

(71) Applicant: International Business Machines Corporation, Armonk, NY (US)

(72) Inventors: Curtis S. Eide, Rochester, MN (US); Christopher J. Engel, Rochester, MN (US); Kaveh Naderi, Austin, TX (US); Matthew S. Spinler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 15/099,540

(22) Filed: Apr. 14, 2016

(65) Prior Publication Data

US 2017/0300446 A1    Oct. 19, 2017

(51) Int. Cl.
*G06F 13/00* (2006.01)
*G06F 13/40* (2006.01)
*G06F 13/42* (2006.01)

(52) U.S. Cl.
CPC ...... *G06F 13/4068* (2013.01); *G06F 13/4022* (2013.01); *G06F 13/4282* (2013.01)

(58) Field of Classification Search
None
See application file for complete search history.

(56) References Cited

U.S. PATENT DOCUMENTS

| | | | |
|---|---|---|---|
| 9,213,666 B2 | 12/2015 | Adler et al. | |
| 9,645,902 B2* | 5/2017 | Breakstone | ......... G06F 11/2012 |
| 2015/0089249 A1 | 3/2015 | Hannon et al. | |
| 2015/0286601 A1 | 10/2015 | Buckland et al. | |
| 2016/0335220 A1* | 11/2016 | Breakstone | ......... G06F 13/4068 |

* cited by examiner

*Primary Examiner* — Farley Abad
*Assistant Examiner* — Richard B Franklin
(74) *Attorney, Agent, or Firm* — VanLeeuwen & VanLeeuwen; Steven L. Bennett

(57) ABSTRACT

An approach is provided in which a host system receives a request to power down a selected I/O module located in a PCIe I/O expansion drawer. The host system identifies at least one cable card located in the host system that corresponds to the selected I/O module and transmits at least one set of sideband signals to the PCIe I/O expansion drawer through at least one set of PCIe cable links. The host system, in turn, inhibits the transmission of the at least one set of sideband signals to power down the selected I/O module.

20 Claims, 8 Drawing Sheets

CONCURRENT MAINTENANCE OF MODULAR PCIE I/O EXPANSION DRAWER

BACKGROUND

The present disclosure relates to a host system using sideband signals through PCIe cabling links to control power to PCIe I/O expansion drawer I/O modules.

Peripheral Component Interconnect Express (PCIe) is a serial expansion bus standard for connecting a computer to peripheral devices. The PCIe standard is well known as a PC backplane interface standard, and has gained popularity as a high-speed cabling interface using PCIe cable pairs. PCIe cable pairs, or PCIe cable links, couple host systems to PCIe expansion drawers that increase, or "expand" the amount of PCIe slots of the host system.

PCIe cable links support similar signals as the backplane version of the PCIe bus structure, which include 1) high-speed differential wire pairs to transfer data and 2) additional wires that support "sideband signals." Sideband signals provide additional functionality to the PCIe interface but are not directly involved in PCIe data transfers. The sideband signals may include a reference clock signal, a cable present signal, a platform present signal, a cable power on signal, a sideband return signal, a 3.3 V power signal, etc.

Some of today's I/O expansion drawers have a dedicated, proprietary service network running over separate service cables between the host system and I/O expansion drawers to provide servicing functions such as concurrent maintenance. Concurrent maintenance allows an operator to perform maintenance on the system while a portion of the system is powered on. The host system includes a service processor that owns the service network connection to the I/O expansion drawers and sends commands over the separate service cables to control power to the I/O expansion drawers during drawer-level concurrent maintenance.

BRIEF SUMMARY

According to one embodiment of the present disclosure, an approach is provided in which a host system receives a request to power down a selected I/O module located in a PCIe I/O expansion drawer. The host system identifies at least one cable card located in the host system that corresponds to the selected I/O module and transmits at least one set of sideband signals to the PCIe I/O expansion drawer through at least one set of PCIe cable links. The host system, in turn, inhibits the transmission of the at least one set of sideband signals to power down the selected I/O module.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
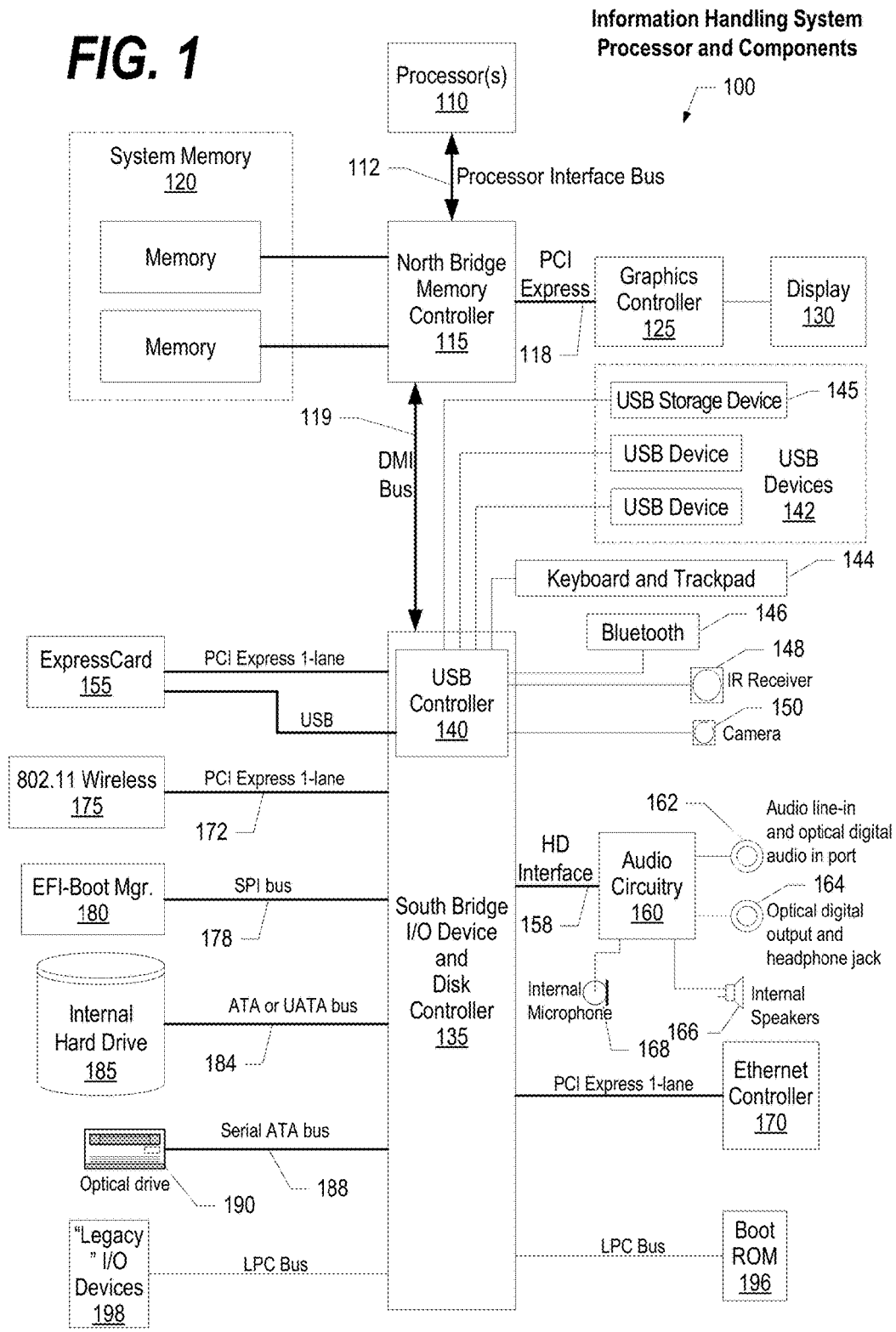
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
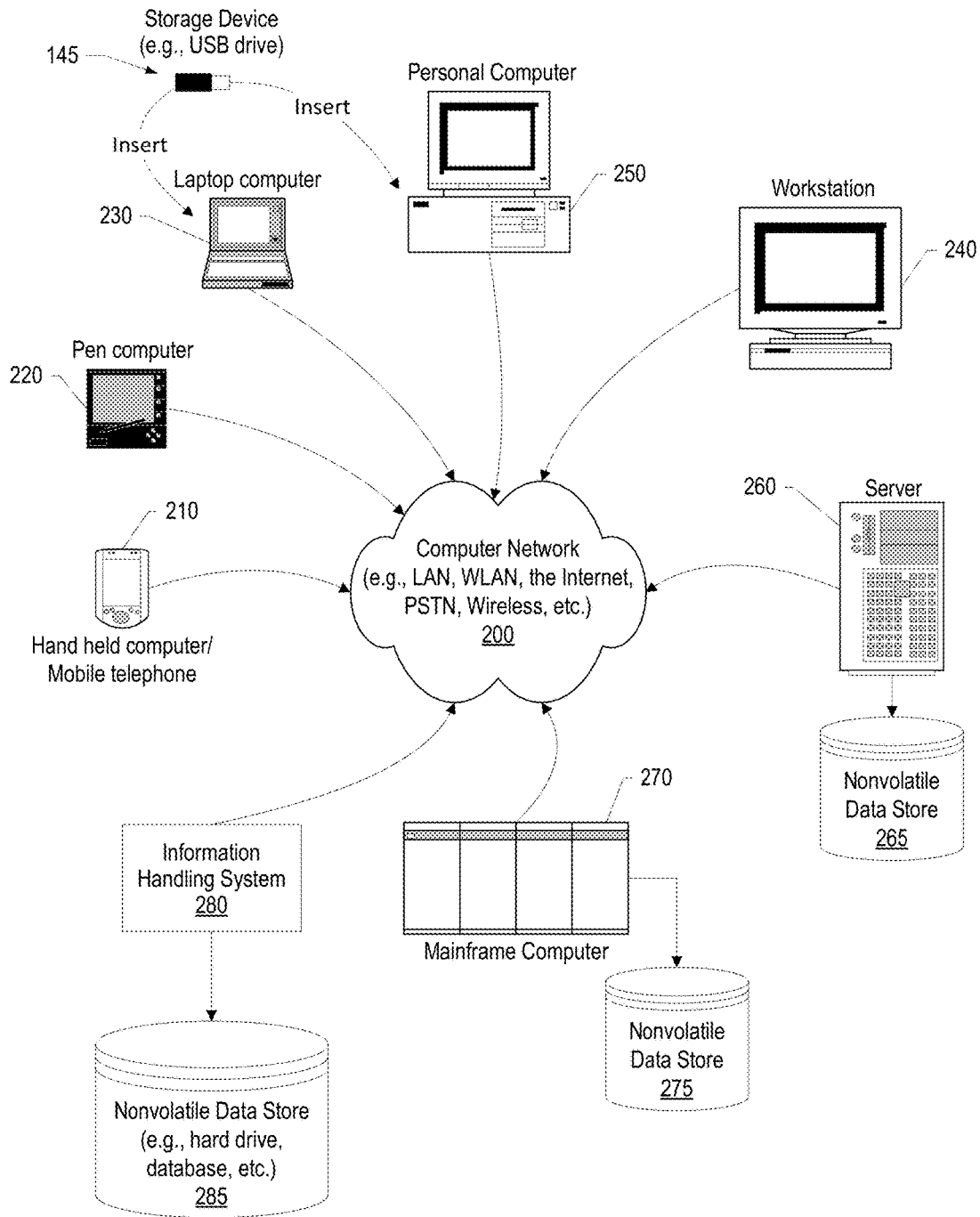
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depict separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that can be executed on an information handling system. The information handling system, such as a server, controls power to PCIe I/O expansion drawer I/O modules by activating and deactivating sideband signals traveling through PCIe cable links to the PCIe I/O expansion drawers. When an I/O module requires maintenance, the information handling system deactivates each sideband signal corresponding to the I/O module. The PCIe I/O expansion drawer detects the deactivation of each of the sideband signals connected to the I/O module and powers down the corresponding I/O module. Likewise, when maintenance is complete on the I/O module, the information handling system activates the sideband signals to the I/O module. The PCIe I/O expansion drawer detects the activation of any of the sideband signals connected to the I/O module and, in turn, powers on the I/O module accordingly.

Benefits of the disclosure over the prior art described herein include, but are not limited to, a reduction in cabling by removing service cables, a removal of specific commands in the service processor to power on or off PCIe expansion drawers, or parts included in PCIe expansion drawers, and the increased granularity to power on or off I/O modules within a particular PCIe expansion drawer.

Figure 3:
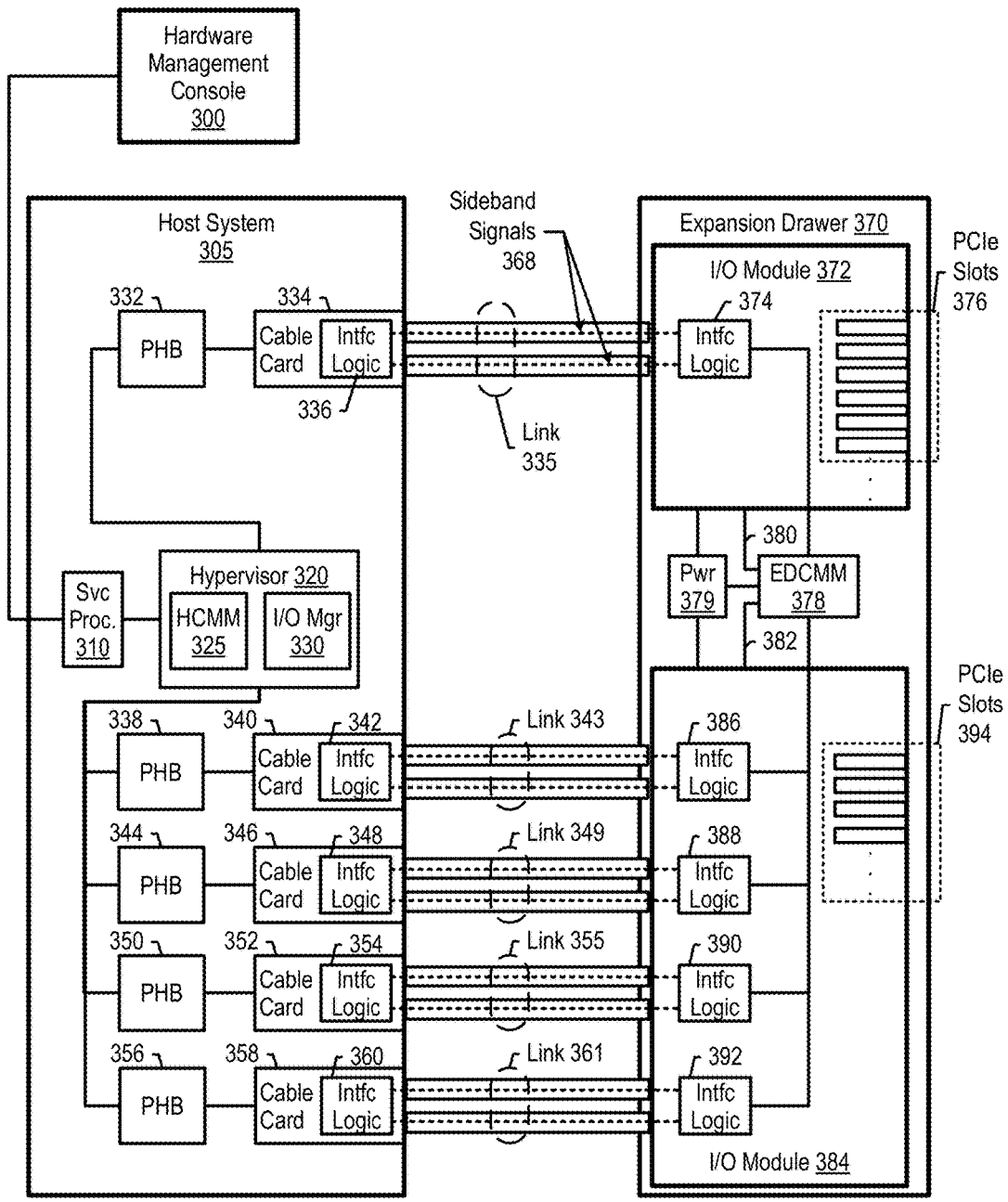
FIG. 3 is a diagram depicting a host system that controls power to PCIe I/O expansion drawer I/O modules by activating/deactivating sideband signals traveling over PCIe cable links.

FIG. 3 is a diagram depicting a host system that controls power to PCIe I/O expansion drawer I/O modules by activating/deactivating sideband signals traveling over PCIe cable links. Host system 305 receives requests from hardware management console 300 to power on or power off I/O modules 372 or 384 located in expansion drawer 370. As discussed below, host system 305 identifies which of cable cards 334, 340, 346, 352, and 358 correspond to the request and powers down the corresponding cable cards that, in turn, deactivates their respective set of sideband signals (e.g., sideband signals 368) sent to expansion drawer 370 over PCIe cable links 335, 343, 349, 355, or 361. For example, when I/O module 372 requires maintenance, hypervisor 320 uses PCIe host bridge (PHB) 332 to power down cable card 334, which powers down interface logic 336 and deactivates sideband signals 368. As a note, FIG. 3 does not include numerical references for the sideband signals in PCIe cable links 343, 349, 355, and 361 for drawing simplicity purposes.

An operator uses hardware management controller (HMC) 300 to send a request to host system 305 to power down a particular I/O module. HMC 300 initiates a power down request that includes an I/O module location code (IMLC) corresponding to the specific I/O module. In one embodiment, HMC 300 sends the power down request through service processor 310 to hypervisor 320. Hypervisor 320, in one embodiment, includes host concurrent management manager (HCMM) 325 and I/O manager 330.

HCMM 325 translates the IMLC to an I/O Module Dynamic Reconfiguration Connector (IMDRC) index and sends a call to I/O manager 330 for further processing. I/O manager 330 receives the IMDRC index and, referring to FIG. 8, 1) locates IMDRC index 815's corresponding I/O module object 850, 2) identifies cable card DRC indexes 860 in I/O module object 850, and 3) identifies corresponding cable cards 340, 346, 352, and 358 (also shown in FIG. 3).

Next, I/O manager 330 powers down the corresponding cable cards using PCIe host bridges (PHB) 338, 344, 350, and 356, which powers down their corresponding interface logic components (e.g., FPGA's). Using the example above, I/O manager 330 powers down cable cards 340, 346, 352, and 358 that, in turn, powers down interface logic components 342, 348, 354, and 360, causing their respective sideband signals to become deactivated over PCIe cable links 343, 349, 355, and 361.

Expansion drawer 370 includes two I/O modules 372 and 384. Each I/O module includes interface logic components (e.g., FPGA's) that monitor sideband signals from host system 305 over PCIe cable links. As can be seen, I/O module 372 includes interface logic component 374, which monitors sideband signals 368 over PCIe cable link 335. In one embodiment, I/O module 372 also includes a PCIe switch to manage multiple PCIe slots 376 that utilize PCIe cable link 335.

I/O module 384 includes interface logic components 386, 388, 390, and 392 to monitor sideband signals over PCIe cable links 343, 349, 355, and 361, respectively. In one embodiment, PCIe slots 394 include a PCIe slot for each of PCIe cable links 343, 349, 355, and 361.

Each of the interface logic components in expansion drawer 370 provides a "link active" signal to expansion drawer concurrent management manager (EDCMM) 378, indicating whether its corresponding sideband signals from host system 305 are activated or deactivated. In one embodiment, the interface logic components assert the link active signal when sideband signals are activated on their corresponding links, and de-assert the link active signal when the sideband signals are deactivated.

Continuing with the example discussed above pertaining to maintenance of I/O module 384, interface logic components 386, 388, 390, and 392 detect that their corresponding sideband signals have been deactivated and de-assert their corresponding link active signals to EDCMM 378. When EDCMM 378 detects that all the link active signals from I/O module 384 are de-asserted, EDCMM 378 powers down I/O module 384 via power control 382. In one embodiment, EDCMM 378 uses power control 382 to programmatically power down I/O module 384 via soft switches (see FIG. 4 and corresponding text for further details).

Likewise, when host system 305 receives a request to power down I/O module 372, I/O manager powers down cable card 334 via PHB 332, which powers down interface logic component 336 that, as a result, deactivates sideband signals 368 over PCIe cable link 335. Interface logic component 374 detects the deactivation of the sideband signals and de-asserts its link active signal to EDCMM 378. EDCMM 378, in turn, powers down I/O module 372 via power control 380, such as by programmatically powering down I/O module 372 via soft switches.

After maintenance is complete, the operator uses HMC 300 to send a power on request to hypervisor 320 through service processor 310 to power on the recently serviced I/O module. HCMM 325 translates the I/O module location code to an I/O module DRC index and passes the I/O module DRC index to I/O manager 330. I/O manager 330 identifies the cable cards corresponding to the I/O module DRC index and powers on the identified cable cards, which powers on their corresponding interface logic components and activates their sideband signals. The interface logic components on the recently serviced I/O module in expansion drawer 370 detect the sideband signal activation and assert their link active signals to EDCMM 378. In turn, EDCMM 378 powers on the recently serviced I/O module via power control 380 or 382 (see FIG. 5 and corresponding text for further details).

In one embodiment, an operator may wish to power down an entire expansion drawer. In this embodiment, hardware management console 300 sends a power down request to host system 305 that includes a drawer location code (DLC). HCMM 325 translates the drawer location code to a drawer DRC index, and then calls I/O manager 330. I/O manager 330 identifies which cable cards are associated with expansion drawer 370 and proceeds to power down each cable card to deactivate its corresponding sideband signals (see FIG. 6 and corresponding text for further details). EDCMM 378 detects that the sideband signals to the expansion drawer are deactivated and, in one embodiment, sends a message to power module 379 to power down the expansion drawer (see FIG. 6 and corresponding text for further details).

Figure 7:
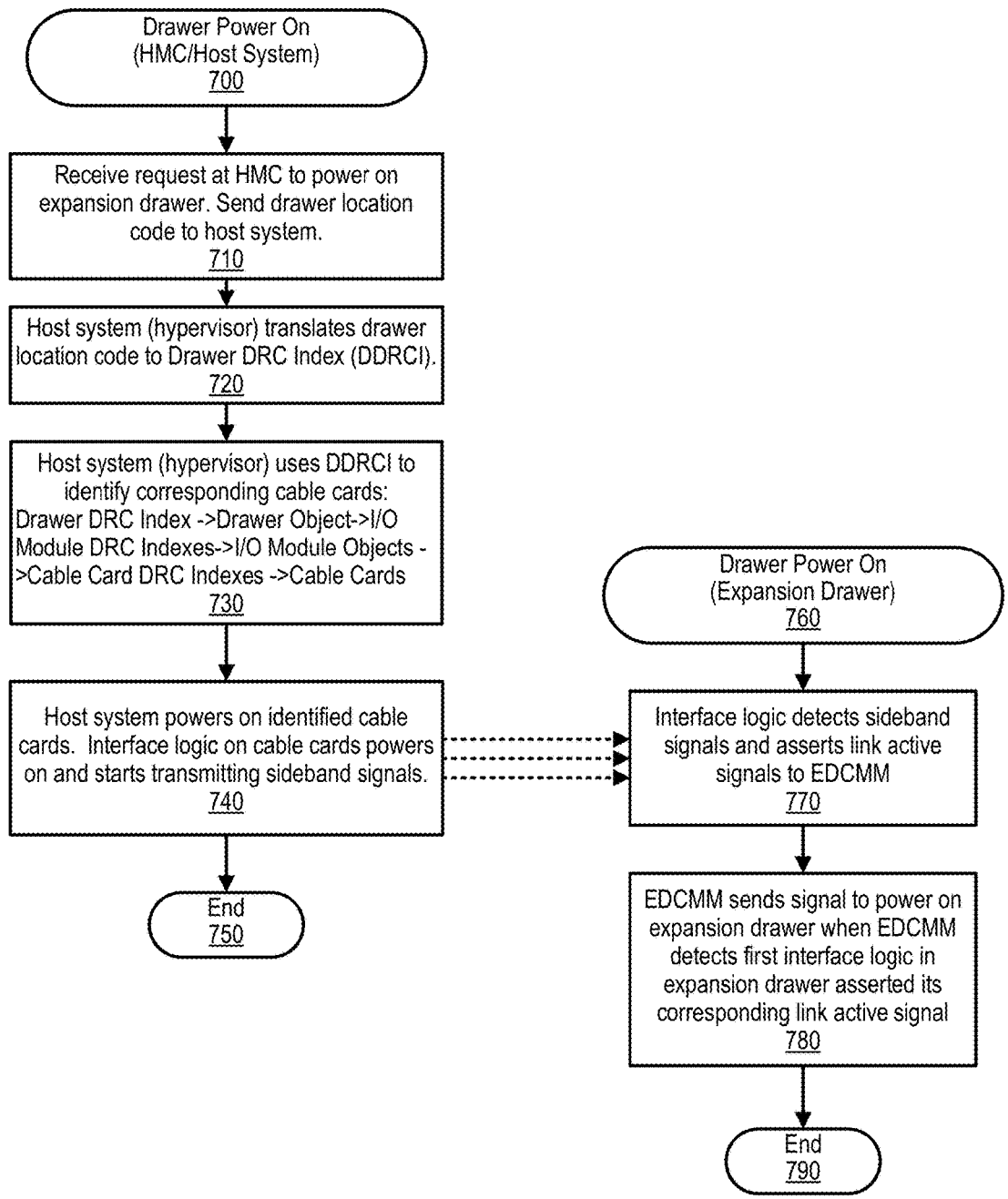
FIG. 7 is a flowchart depicting steps taken by an information handling system to power up a PCIe expansion drawer.

Once expansion drawer 370 is finished being serviced, HMC 300 sends a power on request to host system 305 to restore power to expansion drawer 370 by activating each of the recently deactivated sideband signals (see FIG. 7 and corresponding text for further details).

Figure 4:
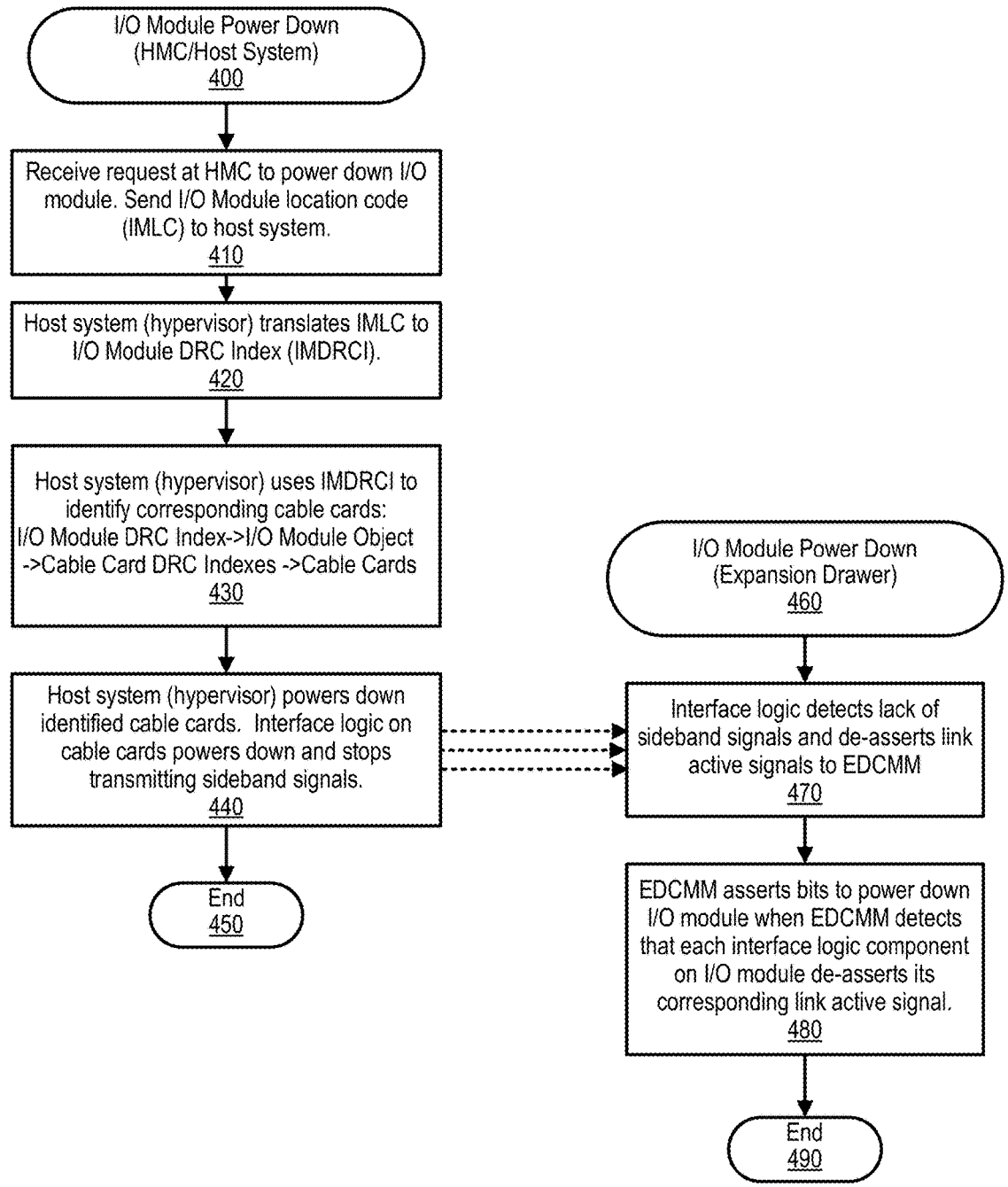
FIG. 4 is a flowchart depicting steps taken by an information handling system to power down a specific PCIe expansion drawer I/O module by deactivating sideband signals on corresponding PCIe cable links.

FIG. 4 is a flowchart depicting steps taken by an information handling system to power down a specific PCIe expansion drawer I/O module by deactivating sideband signals on corresponding PCIe cable links.

FIG. 4 processing commences at 400 whereupon, at step 410, the host management controller (HMC), also referred to as hardware management controller, receives a request to power down a particular I/O module. For example, I/O module 384 shown in FIG. 3 may require servicing. The HMC, in turn, sends a power down request to the host system that includes an I/O module location code (IMLC) corresponding to the specific I/O module.

At step 420, a hypervisor executing on the host system receives the IMLC and translates the IMLC to an I/O Module DRC index (IMDRCI). In one embodiment, as shown in FIG. 3, HMC 300 sends the IMLC to service processor 310 located on the host, which forwards the IMLC to hypervisor 320. In another embodiment, the hypervisor includes a host concurrent maintenance component (HCMM 325 in FIG. 3) that translates the IMLC to the IMDRCI.

At step 430, the hypervisor uses the IMDRCI to identify corresponding cable cards on the host system. In one embodiment, the hypervisor proceeds through a series of steps to identify cable cards. For example, and referring to FIG. 8, the hypervisor may 1) receive IMDRC index 815 and locate its corresponding I/O module object 850, 2) identify cable card DRC indexes 860 in I/O module 850, and 3) identify cable cards 340, 346, 352, and 358 that correspond to cable card DRC indexes 860. In another embodiment, the hypervisor includes an I/O manager (I/O manager 330 shown in FIG. 3) that performs the steps to associate cable cards to the IMDRCI.

At step 440, the hypervisor (e.g., I/O manager within the hypervisor) powers down the corresponding cable cards. When the cable cards power down, interface logic components on the cable cards stop transmitting sideband signals over the PCIe cable links to the PCIe I/O expansion drawer. Referring to FIG. 3, when cable card 334 powers down, interface logic component 336 also powers down and stops transmitting sideband signals 368 to interface logic component 374 over PCIe cable link 335. HMC/Host processing ends at 450.

PCIe I/O expansion drawer processing commences at 460 whereupon, at step 470, the PCIe I/O expansion drawer's I/O module's interface logic components detect a lack of sideband signals and de-assert their corresponding link active signal to the expansion drawer concurrent maintenance module (EDCMM). In one embodiment, several interface logic components perform step 470. For example, referring to FIG. 3, I/O module 384 includes interface logic components 386, 388, 390, and 392 corresponding to four cable links between host system 305 and expansion drawer 370. In this example, each of interface logic components 386, 388, 390, and 392 perform step 470.

At step 480, once all of the link active signals are deactivated for a specific I/O module, the EDCMM powers down the specific I/O module by, in one embodiment, asserting bits on soft switches. Expansion drawer processing thereafter ends at 490.

Figure 5:
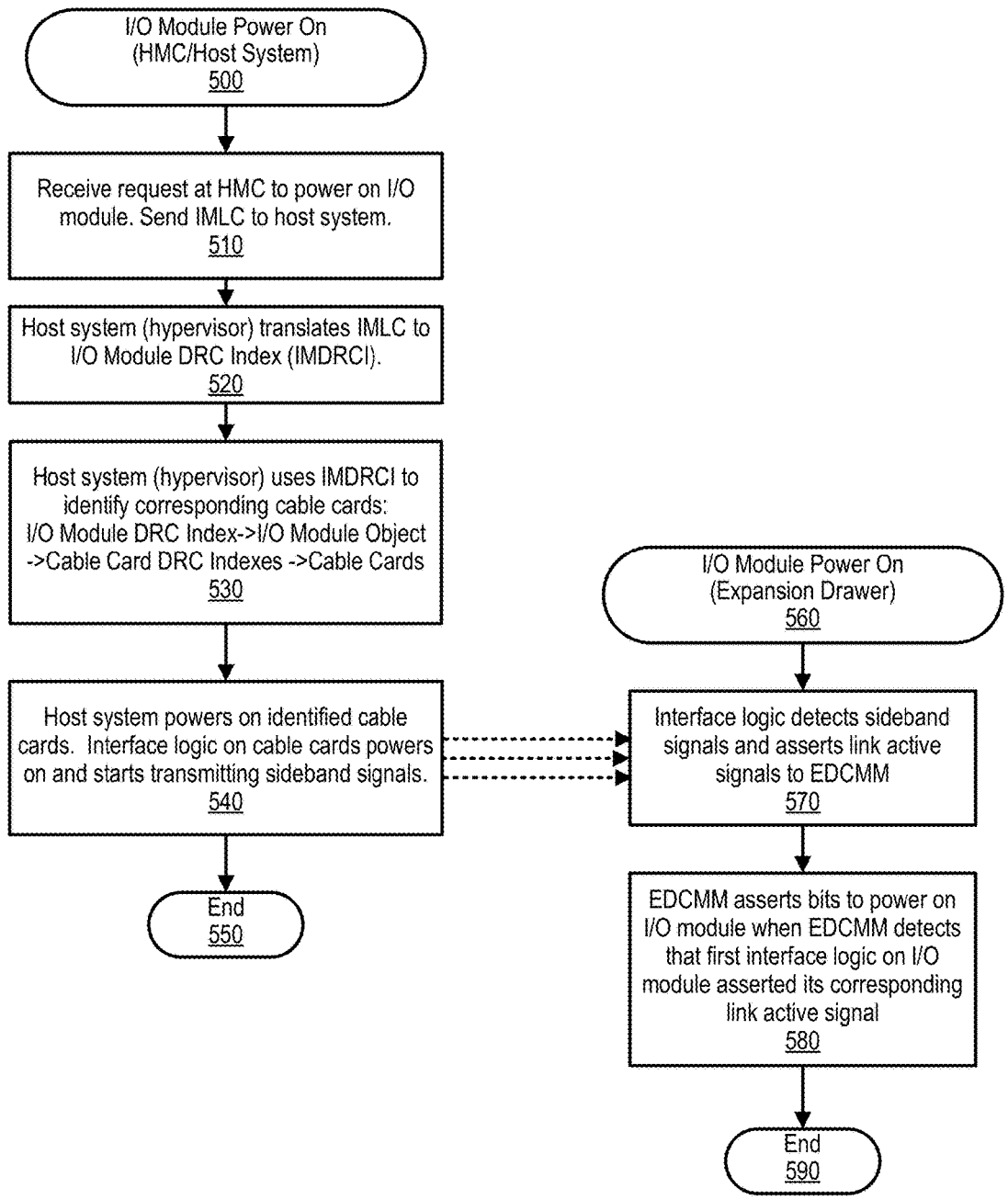
FIG. 5 is a flowchart depicting steps taken by an information handling system to power up a specific PCIe expansion drawer I/O module by activating sideband signals on corresponding PCIe cable links.

FIG. 5 is a flowchart depicting steps taken by an information handling system to power up a specific PCIe expansion drawer I/O module by activating sideband signals on corresponding PCIe cable links.

FIG. 5 processing commences at 500 whereupon, at step 510, the host management controller (HMC) receives a request to power on a particular I/O module, such as one that was recently powered down for servicing. The HMC, in turn, sends a power on request to the host system that includes an I/O module location code (IMLC) corresponding to the specific I/O module. At step 520, a hypervisor executing on the host system receives the IMLC and translates the IMLC to an I/O Module DRC index (IMDRCI) as discussed previously.

At step 530, the hypervisor uses the IMDRCI to identify corresponding cable cards on the host system as discussed previously and, at step 540, the hypervisor (e.g., I/O manager within the hypervisor) powers up the corresponding cable cards. When the cable cards power up, interface logic components on the cable cards start transmitting sideband signals over the PCIe cable links to the PCIe I/O expansion drawer. Referring to FIG. 3, when cable card 334 powers up, interface logic component 336 also powers up and starts transmitting sideband signals 368 to interface logic component 374 over PCIe cable link 335. HMC/Host processing ends at 550.

PCIe I/O expansion drawer processing commences at 560 whereupon, at step 570, an interface logic component on the I/O module detects activation of its sideband signals and asserts its corresponding link active signal to the expansion drawer concurrent maintenance module (EDCMM). At step 580, the EDCMM asserts bits to power on the corresponding I/O module when the EDCMM detects a first link active signal being asserted from one of the interface logic components on the corresponding I/O module. Expansion drawer processing thereafter ends at 590.

Figure 6:
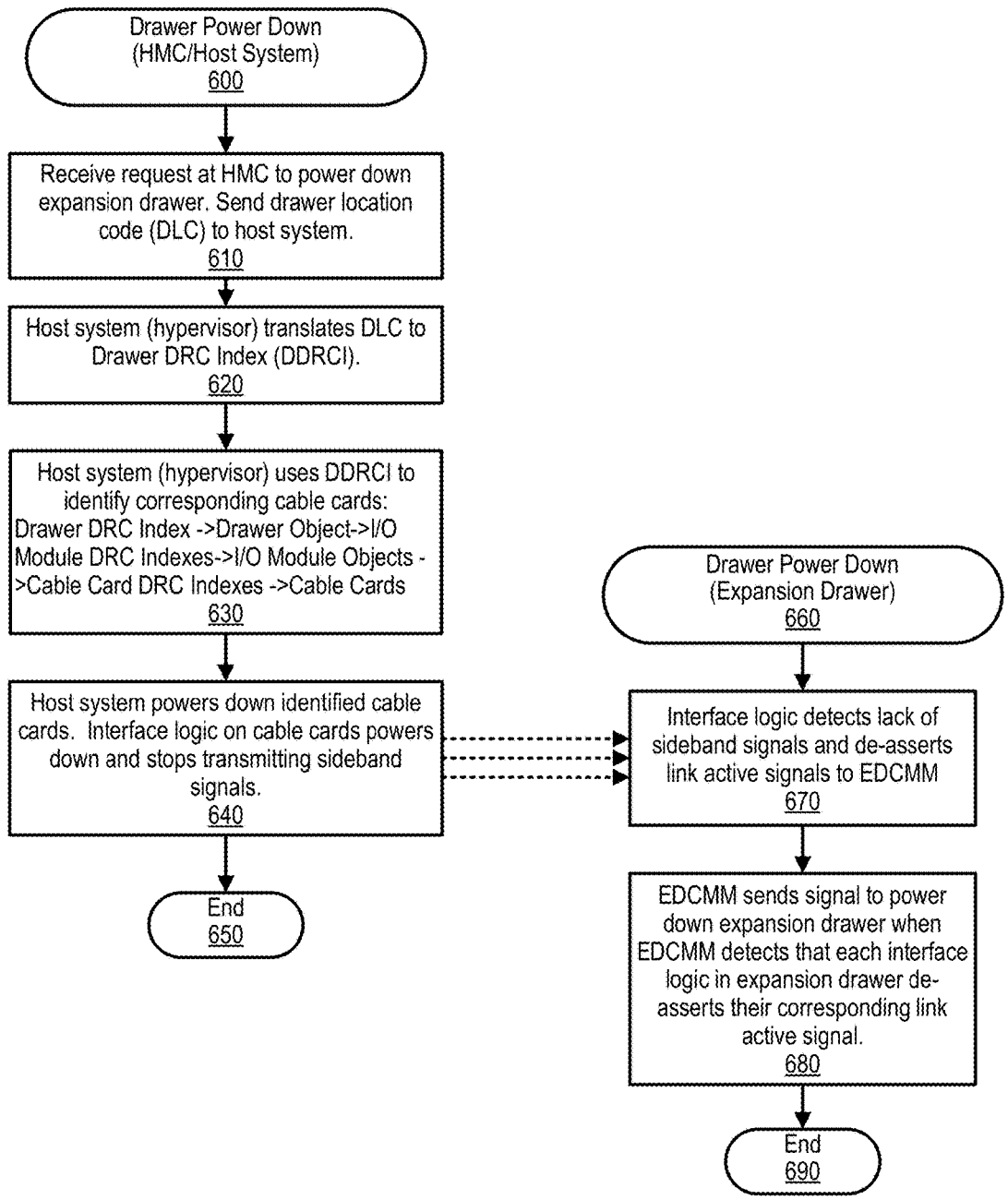
FIG. 6 is a flowchart depicting steps taken by an information handling system to power down a PCIe expansion drawer.

FIG. 6 is a flowchart depicting steps taken by an information handling system to power down a PCIe expansion drawer by deactivating sideband signals on corresponding PCIe cable links.

FIG. 6 processing commences at 600 whereupon, at step 610, the host management controller (HMC) receives a request to power down a PCIe expansion drawer. The HMC, in turn, sends a power down request to the host system that includes a drawer location code (DLC) corresponding to the PCIe I/O expansion drawer.

At step 620, a hypervisor executing on the host system receives the DLC and translates the DLC to Drawer DRC index (DDRCI). At step 630, the hypervisor uses the DDRCI to identify corresponding cable cards on the host system. In one embodiment, the hypervisor proceeds through a series of steps to identify cable cards. For example, the hypervisor may receive the DDRCI and locate its corresponding drawer object; identify I/O module DRC indexes in the drawer object; identify I/O module objects from the I/O module DRC indexes; identify cable card DRC indexes in the I/O module objects; and identify cable cards corresponding to the cable card DRC indexes.

At step 640, the hypervisor (e.g., I/O manager within the hypervisor) powers down the corresponding cable cards and, as discussed previously, interface logic components on the cable cards stop transmitting sideband signals over their corresponding PCIe cable links. HMC/Host processing ends at 650.

PCIe I/O expansion drawer processing commences at 660 whereupon, at step 670, interface logic components on I/O modules within the PCIe I/O expansion drawer detect a lack of sideband signals and de-assert their corresponding link active signals to the expansion drawer concurrent maintenance module (EDCMM). At step 680, when the EDCMM detects de-assertion of the last link active signal, the EDCMM sends a signal to the power controller to power down the expansion drawer. Expansion drawer processing thereafter ends at 690.

FIG. 7 is a flowchart depicting steps taken by an information handling system to power up a PCIe expansion drawer by activating sideband signals on corresponding PCIe cable links.

FIG. 7 processing commences at 700 whereupon, at step 710, the host management controller (HMC) receives a request to power on a PCIe expansion drawer, such as one that was recently powered down for maintenance. The HMC, in turn, sends a power on request to the host system that includes a drawer location code (DLC) corresponding to the PCIe I/O expansion drawer.

At step 720, a hypervisor executing on the host system receives the DLC and translates the DLC to Drawer DRC index (DDRCI). At step 730, the hypervisor uses the DDRCI to identify corresponding cable cards on the host system as discussed herein. At step 740, the hypervisor (e.g., I/O manager within the hypervisor) powers up the corresponding cable cards and, as discussed previously, interface logic components on the cable cards commence transmitting sideband signals over their corresponding PCIe cable links. HMC/Host processing ends at 750.

PCIe I/O expansion drawer processing commences at 760 whereupon, at step 770, interface logic components on I/O modules within the PCIe I/O expansion drawer detect sideband signals and assert their corresponding link active signals to the expansion drawer concurrent maintenance module (EDCMM). At step 780, when the EDCMM detects assertion of the first link active signal, the EDCMM sends a signal to the power controller to power up the expansion drawer. Expansion drawer processing thereafter ends at 790.

Figure 8:
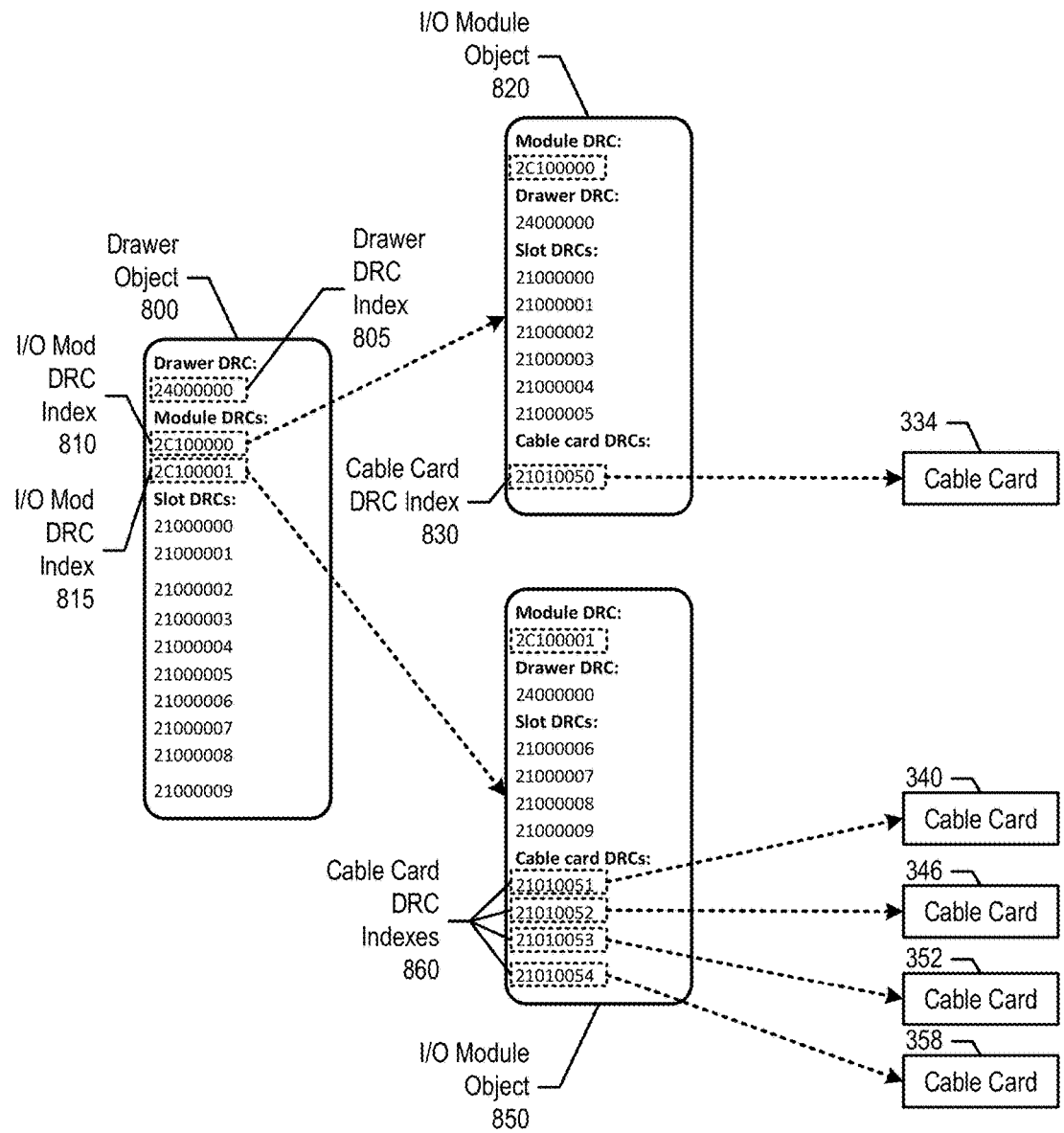
FIG. 8 is a diagram depicting relationships between various objects, indexes, and cable cards.

FIG. 8 is a diagram depicting relationships between various objects, indexes, and cable cards. Drawer object 800 corresponds to a particular PCIe I/O expansion drawer (drawer DRC index 805) and includes indexes of I/O modules (I/O module DRC index 810 and 815) included in the PCIe I/O expansion drawer.

The I/O module DRC indexes correspond to I/O module objects 820 and 850. Each I/O module object includes cable card DRC indexes that correspond to cable cards on the host system that interface to the particular I/O module via PCIe cable links. I/O module object 820 includes cable card DRC index 830, which corresponds to cable card 334 located on the host system. Likewise, I/O module object 850 includes cable card DRC indexes 860, which correspond to cable cards 340, 346, 352, and 358 located on the host system.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

receiving, at a host system, a request to power down a selected one of a plurality of I/O modules located in a PCIe I/O expansion drawer, wherein the PCIe I/O expansion drawer interfaces to the host system via a plurality of PCIe cable links;

identifying at least one of a plurality of cable cards located in the host system that corresponds to the selected I/O module, wherein the identified at least one cable card transmits at least one set of sideband signals to the PCIe I/O expansion drawer through at least one of the plurality of PCIe cable links; and inhibiting the transmission of the at least one set of sideband signals to power down the selected I/O module.

2. The method of claim 1 further comprising:

detecting, at the PCIe expansion drawer, an absence of the at least one set of sideband signals;

powering down, by the PCIe expansion drawer, the selected I/O module in response to the detecting of the absence of the at least one set of sideband signals; and maintaining power, by the PCIe expansion drawer, to at least a different one of the plurality of I/O modules while the selected I/O module is powered down.

3. The method of claim 2 wherein the powering down of the selected I/O module further comprises:

configuring one or more soft switches corresponding to the selected I/O module to prevent power to the selected I/O module.

4. The method of claim 2 further comprising:

resuming the transmission, by the host system, of the at least one set of sideband signals in response to receiving a request to power up the selected I/O module; and powering up, by the PCIe expansion drawer, the selected I/O module in response to detecting a presence of the at least one set of sideband signals.

5. The method of claim 1 wherein the inhibiting further comprises:

removing power from the identified at least one cable card by the host system.

6. The method of claim 1 further comprises:

receiving, at the host system, a different request to power down the PCIe I/O expansion drawer;

determining that each of the plurality of cable cards corresponds to the PCIe I/O expansion drawer;

preventing each of the plurality of cable cards from transmitting its set of sideband signals over its corresponding one of the plurality of cable links to power down the PCIe I/O expansion drawer.

7. The method of claim 1 wherein the identified at least one cable card also transmits PCIe data over the at least one of the plurality of PCIe cable links to the PCIe I/O expansion drawer.

8. An information handling system comprising:

one or more processors;

a memory coupled to at least one of the processors; and a set of computer program instructions stored in the memory and executed by at least one of the processors in order to perform actions of:

receiving, at a host system, a request to power down a selected one of a plurality of I/O modules located in a PCIe I/O expansion drawer, wherein the PCIe I/O expansion drawer interfaces to the host system via a plurality of PCIe cable links;

identifying at least one of a plurality of cable cards located in the host system that corresponds to the selected I/O module, wherein the identified at least one cable card transmits at least one set of sideband signals to the PCIe I/O expansion drawer through at least one of the plurality of PCIe cable links; and
inhibiting the transmission of the at least one set of sideband signals to power down the selected I/O module.

9. The information handling system of claim 8 wherein the one or more processors perform additional actions comprising:
detecting, at the PCIe expansion drawer, an absence of the at least one set of sideband signals;
powering down, by the PCIe expansion drawer, the selected I/O module in response to the detecting of the absence of the at least one set of sideband signals; and
maintaining power, by the PCIe expansion drawer, to at least a different one of the plurality of I/O modules while the selected I/O module is powered down.

10. The information handling system of claim 9 wherein the one or more processors perform additional actions comprising:
configuring one or more soft switches corresponding to the selected I/O module to prevent power to the selected I/O module.

11. The information handling system of claim 9 wherein the one or more processors perform additional actions comprising:
resuming the transmission, by the host system, of the at least one set of sideband signals in response to receiving a request to power up the selected I/O module; and
powering up, by the PCIe expansion drawer, the selected I/O module in response to detecting a presence of the at least one set of sideband signals.

12. The information handling system of claim 8 wherein the inhibiting further comprises powering down, by the host system, the identified at least one cable card.

13. The information handling system of claim 8 wherein the one or more processors perform additional actions comprising:
receiving, at the host system, a different request to power down the PCIe I/O expansion drawer;
determining that each of the plurality of cable cards corresponds to the PCIe I/O expansion drawer;
preventing each of the plurality of cable cards from transmitting its set of sideband signals over its corresponding one of the plurality of cable links to power down the PCIe I/O expansion drawer.

14. The information handling system of claim 8 wherein the identified at least one cable card also transmits PCIe data over the at least one of the plurality of PCIe cable links to the PCIe I/O expansion drawer.

15. A method implemented by an information handling system that includes a memory and a processor, the method comprising:
monitoring, at a PCIe expansion drawer, one or more sets of sideband signals transmitted from one or more cable cards residing on a host system, each of the one or more sets of sideband signals corresponding to a selected one of a plurality of I/O modules located in the PCIe expansion drawer;
detecting, by the PCIe expansion drawer, an absence of each of the one or more sets of sideband signals; and
powering down the selected I/O module by the PCIe expansion drawer.

16. The method of claim 15 wherein the powering down of the selected I/O module further comprises:
configuring one or more soft switches corresponding to the selected I/O module to prevent power to the selected I/O module.

17. The method of claim 15 further comprising:
maintaining power, by the PCIe expansion drawer, to at least a different one of the plurality of I/O modules while the selected I/O module is powered down.

18. The method of claim 15 wherein, subsequent to the inhibiting of the power to the selected I/O module, the method further comprises:
detecting, by the PCIe expansion drawer, a presence of at least one of the one or more sets of sideband signals; and
powering up the selected I/O module.

19. The method of claim 15 wherein a different one or more sets of sideband signals correspond to a different one of the plurality of I/O modules, the method further comprising:
detecting, by the PCIe expansion drawer, an absence of each of the different one or more sets of sideband signals;
powering down the PCIe expansion drawer in response to the detecting of the absence of each of the one or more sets of sideband signals and the different one or more sets of sideband signals.

20. The method of claim 19 wherein, subsequent to the powering down of the PCIe expansion drawer, the method further comprises:
powering up the PCIe expansion drawer in response to detecting a presence of at least one of the one or more sets of sideband signals or the different one or more sets of sideband signals.

* * * * *